(No Model.)

I. M. WARNER.
VEHICLE HUB AND AXLE.

No. 450,438. Patented Apr. 14, 1891.

Witnesses:
S. M. Hulbert
H. W. B. Dogherty

Inventor:
Isaac M. Warner
By Ross S. Sprague & Son
Att'y.

THE NORRIS PETERS CO., PHOTO-LITHO., WASHINGTON, D. C.

UNITED STATES PATENT OFFICE.

ISAAC M. WARNER, OF BRONSON, ASSIGNOR OF ONE-HALF TO JOHN NEAL, OF COLDWATER, MICHIGAN.

VEHICLE HUB AND AXLE.

SPECIFICATION forming part of Letters Patent No. 450,438, dated April 14, 1891.

Application filed August 29, 1890. Serial No. 363,450. (No model.)

*To all whom it may concern:*

Be it known that I, ISAAC M. WARNER, a citizen of the United States, residing at Bronson, in the county of Branch and State of Michigan, have invented certain new and useful Improvements in Vehicle Hubs and Axles, of which the following is a specification, reference being had therein to the accompanying drawings.

This invention relates to new and useful improvements in vehicle hubs and axles; and the invention consists in the peculiar construction of an axle-box formed in two parts secured within the hub, said parts being formed of glass; further, in the peculiar means of fastening this box upon the axle and to the hub, whereby the sand is effectually excluded and all danger of losing the nut is obviated; and, further, in the peculiar construction, arrangement, and combination of the various parts, all as more fully hereinafter described.

Figure 1:
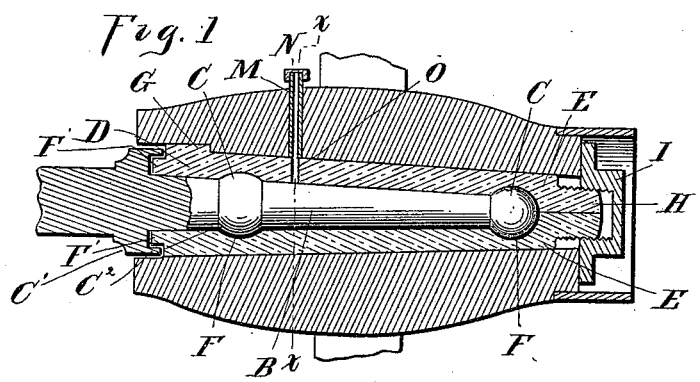
Figure 2:
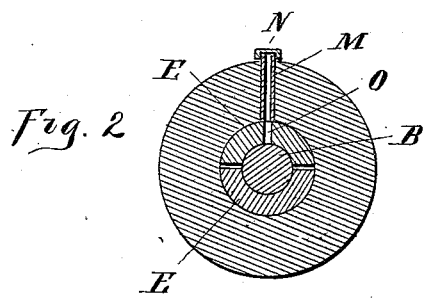

In the drawings, Figure 1 is a vertical central section through my improved hub and axle. Fig. 2 is a vertical cross-section thereof on line $x\, x$.

A is the axle, which has a spindle B, tapered toward its outer end and provided with the spherical enlargement or bearings C. The axle is provided at the inner end of the spindle with the collar C', which has the inwardly-projecting lip C'', which acts as a sand-band, and a locking-flange for the axle-box D. This box is made in two longitudinally-separable sections E, each of said halves being suitably cut out to form a bearing for the spindle of the axle, and also has suitable countersunk recesses F to receive the enlargements C of the spindle. The box at the inner end has the annular securing-flange F', adapted to engage under the flange or lip C'', to hold it in position.

The hub has a suitable tapered opening to receive the axle-box, and also has a keyway to receive the key or flange G, formed on the outside of the box. At the forward end the axle-box extends beyond the axle-spindle, and has formed thereon the screw-threaded portion or bolt H, extending beyond the end of the hub and adapted to receive the nut I, which, when screwed up firmly to a seat against the hub, securely holds the same in position, the enlargements C preventing end motion of the parts.

M is an oil-duct having a suitable cap N, extending through the hub and registering with the aperture O in the axle-box.

It is evident that as the axle-box turns with the hub, and the nut turns with the box, there is no friction between the hub and nut, as in ordinary axles, thus obviating any danger of loosening the nut in the turning of the wheel.

The flange F' engages under the lip C'' and forms a most efficient sand-band.

The spherical enlargements take up the wear in the axle-box, and by simply screwing up the nut I prevent any rattling of the parts.

The two sections E, I make of glass, as I have found that by the use of glass, in connection with a steel axle, all danger of a hot box is obviated, and I can run my vehicle without the use of oil.

I provide means for oiling the box; but it is not necessary that it should be oiled at any time. I thus overcome all the trouble of taking off the wheel to oil it. All danger of a hot box is thus avoided, and by constructing the box in the manner described any possibility of sand getting into the journal is prevented. What I claim as my invention is—

The combination, with a hub, of the axle-box formed in two separable halves E of glass, countersunk recesses in said box, enlargements upon the axle adapted to fit in said recesses, and extension at the forward ends of said boxes, and means for securing the two halves together upon said extension, substantially as described.

In testimony whereof I affix my signature in presence of two witnesses.

ISAAC M. WARNER.

Witnesses:
M. B. O'DOGHERTY,
R. M. HULBERT.